INVENTOR.
JAMES H. STEIN
BY
ATTORNEYS

INVENTOR.
JAMES H. STEIN

_United States Patent Office_

2,877,407
Patented Mar. 10, 1959

2,877,407

METHOD AND APPARATUS FOR CANCELLING ACCELERATION NOISE IN A MAGNETOMETER

James Henry Stein, Southampton, Pa.

Application November 30, 1955, Serial No. 550,222

9 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

The present invention relates to a method and apparatus for cancelling acceleration noise in a magnetometer or other field detector moving in a field gradient and more particularly to a method and apparatus for accomplishing the above by utilizing an accelerometer for developing an opposing signal to cancel the acceleration noise component of the output of the magnetometer.

In certain applications of magnetometers, such as, for example, in geophysical mapping or in the detection of submerged submarines by aircraft, it is desirable to move the magnetometer at constant speed in a fixed direction and at a uniform altitude above sea level.

In such applications, the magnetometer detects anomalies in the magnetic field indicating the presence of a submarine or other local influence on the earth's field. In order to eliminate components of the field tending to obscure the presence of an anomaly, it is normal practice to subject the magnetometer output to a frequency selective circuit filter to suppress these components. In the magnetic detection of submarines from aircraft the magnetometer output is customarily available as a voltage which fluctuates with time in accordance with the fluctuations of the magnetic intensity along the flight path. This voltage is subjected to two stages of low-pass filters and two stages of high-pass filters, which together attenuate frequencies both above and below a certain desired band of frequencies that are known to exist in the magnetic signal of the target submarine. The value of the desired frequencies depends upon the speed of the aircraft and the distance over which detection is expected. Unwanted fluctuations fall largely outside the band pass of the filters and are attenuated.

There are some types of interfering fluctuations or noise, however, which may have frequency components within the desired band which therefore would not be reduced by the filters to a desirably low value. For example, when the aircraft or vehicle carrying the magnetometer moves with a constant velocity component along the earth's magnetic gradient, it will be apparent that the two high-pass filter stages will in effect provide two differentiation steps of the magnetic profile recorded by the instrument and will produce a zero signal except for extraneous noise and anomalies since the earth's gradient is relatively constant in any particular geographical area. Should the component of velocity of the aircraft along the earth's gradient vary, however, the magnetic profile with respect to time will be irregular causing an additional component to appear in the magnetometer output after the two steps of differentiation. This component or noise can be similar in frequency to the anomalies undergoing detection and would in such case be readily passed by the filters, thus obscuring the nature of the final signals.

The present invention overcomes the defects of prior arrangements for eliminating this type of noise by making use of the fact that the second time derivative of the magnetometer noise caused by motion in a magnetic gradient is exactly proportional to the acceleration experienced by the magnetometer in the direction of the gradient. An accelerometer device of conventional design is, according to the principles of this invention, placed near the magnetometer so that the latter device experiences all the accelerations of the magnetometer. A signal is produced by the accelerometer which is proportional to this acceleration and thereby to the second time derivative of the magnetometer noise caused by motion in the magnetic gradient and this signal is used to compensate in the magnetometer output for this type of noise.

Therefore, the first object of the present invention is the provision of a field detector with means to compensate for noise caused by acceleration of the detector in a field gradient.

Another object of the invention is the provision of apparatus and method for modifying the output of a magnetometer or other detector in order to compensate for the effects of accelerations of the detector in a magnetic gradient.

Still another object is to provide a circuit and method for modifying the second derivative of the output of a magnetometer to compensate for extraneous indications which are a consequence of acceleration of the magnetometer in a magnetic gradient.

Another object of the invention is the provision of a circuit and method for modifying the output of an accelerometer by approximate single or double integration to permit compensation of the acceleration noise in the output of a magnetometer after approximate single or double differentiation.

Another object of the invention is the provision of apparatus and method whereby unwanted noise arising from motion of any field sensing device in a field gradient may be compensated by suitably modifying the amplitude-frequency spectrum of the output of the sensing device and then combining such modified output with the output also suitably modified in amplitude-frequency spectrum, of an accelerometer or velocimeter which is placed so as to experience these same components of accelerations or velocity which the field sensing device experiences and which are parallel to the direction of the gradient of the field, then suitably modifying the amplitude-frequency characteristic of the resultant combined output to provide an over-all amplitude-frequency response which is suitable for the purpose intended.

The exact nature of this invention as well as other objects and advantages thereof will be readily apparent from consideration of the following specification relating to the annexed drawing in which.

The method and apparatus will be described hereinafter in connection with a magnetometer although it is understood that the invention is applicable to any type field detector.

Figure 1:
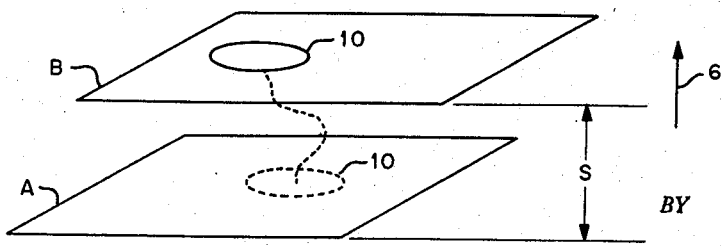
Fig. 1 shows a magnetometer in motion in a uniform gradient.

In Fig. 1 is shown a magnetometer 10 which has moved from its initial position in isogram contour A to a second position in isogram contour B separated by an increment of distance S. The path followed by magnetometer 10 is immaterial. It is evident that any motion of magnetometer 10 in a direction not having any magnetic gradient does not contribute to a change in the magnetic field. Only components of motion in the direction of the magnetic gradient indicated by arrow 6 can cause such field changes.

Let the magnetic gradient be constant and defined by the expression:

$$G = \frac{\Delta H}{\Delta S}$$

where $\Delta H$ and $\Delta S$ are corresponding incremental changes in field and distance, respectively, in the direction along the magnetic gradient.

The field on isogram B then is $$H_B = H_A + SG$$

where $S$ is the distance along the gradient separating the two isograms and $G$ is the magnitude of the gradient.

Differentiating with respect to time, $$\frac{dH_B}{dt} = 0 + \frac{DS}{dt} \times G$$

where $\frac{dS}{dt}$ = speed in the direction along the magnetic gradient

Differentiating again with respect to $t$, $$\frac{d^2 H_B}{dt^2} = \frac{d^2 S}{dt^2} \times G = aG$$

where $a$ equals the instantaneous acceleration of the magnetometer in the direction along the magnetic gradient.

It is apparent, therefore, that the acceleration of the magnetometer is proportional to the second time derivative of the signal produced by the magnetometer due to its accelerations and may be used to counteract the effects of the latter.

Figure 2:
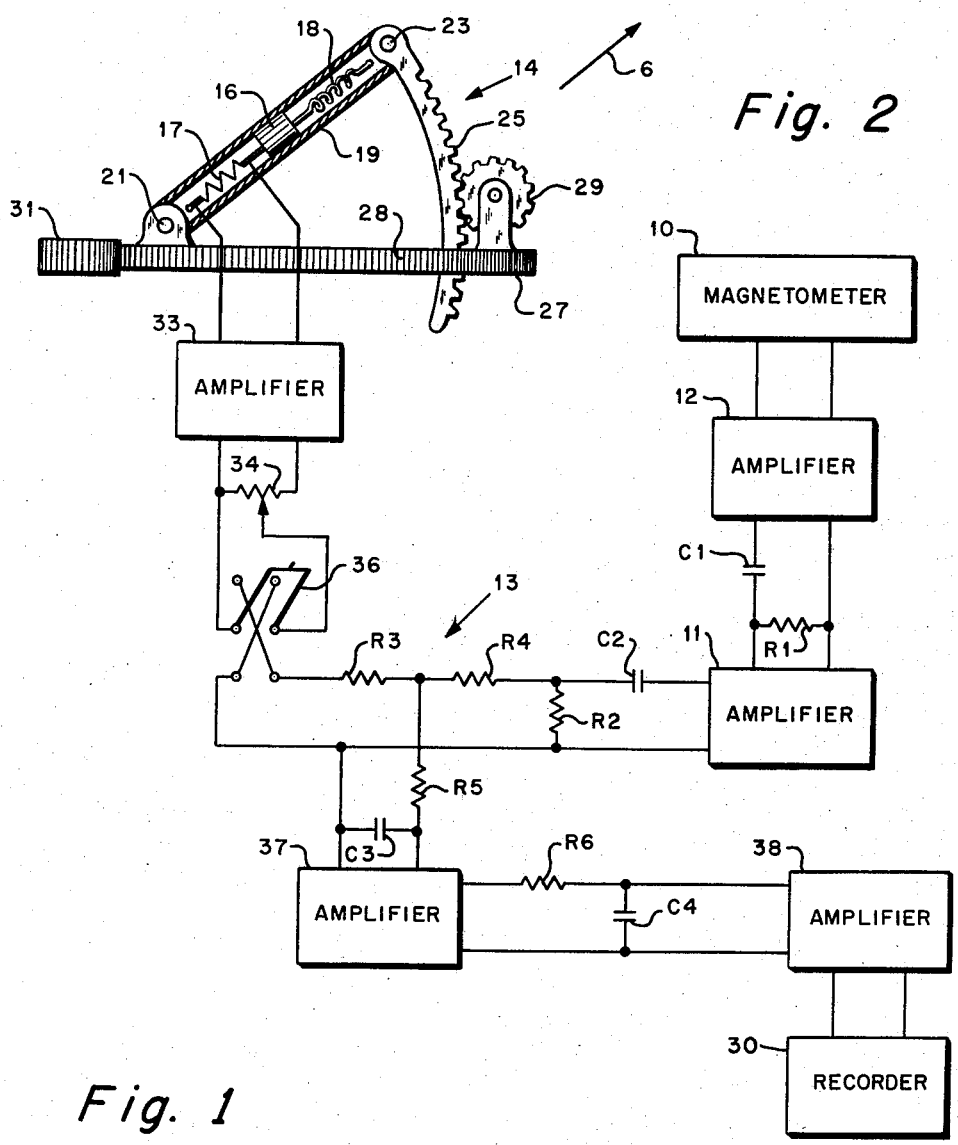
Fig. 2 illustrates a preferred embodiment of the instant invention.

One embodiment of this invention which brings about the results theoretically derived above is shown in Fig. 2. Magnetometer 10, which may be mounted on or in an aircraft, delivers its output to amplifier 12. The first differentiation step is accomplished by the use of a suitable high-pass filter consisting of condenser $C_1$ and resistor $R_1$. The output of this filter arrangement is passed through amplifier 11 and is further differentiated by the filter arrangement of condenser $C_2$ and resistor $R_2$. The output of the second differentiation circuit is passed to a mixing circuit 13 made up of resistors $R_3$ and $R_4$.

An accelerometer 14 which may be of any conventional design is provided to produce a signal voltage which is proportional to the acceleration of the magnetometer in the direction along the gradient and should be placed in a location preferably close to magnetometer 10 so that they may both experience the same accelerations. One type of accelerometer which may be used is the one illustrated, consisting of a weight 16 movably mounted between a resilient resistor element 17 and a coil spring 18 mounted in tubular member 19. Accelerations of device 14 result in weight 16 moving against either resistor 17 or spring 18 causing the resistive value of element 17 to fluctuate accordingly. Resistor 17 is of the strain gage type and forms a bridge with other resistors (not illustrated) placed within and energized by the circuit identified as amplifier 33. Member 19 is pivotally mounted at 21 and connected at its other end to arcuate member 23 provided with gear teeth 25. The whole assembly is mounted on a gear 27 provided with teeth 28 along its circumference. Pinion 29 is engaged with teeth 25 for adjusting the angular position of member 19 while a pinion 31 engaged with teeth 28 of gear 27 controls its azimuth position. Gear 27 is mounted on any conventional gimbal system (not illustrated) which by conventional automatic means such as a gyroscope maintains the unit approximately in a horizontal plane while the craft is being maneuvered. Gear 31 is likewise controlled by automatic devices conventional in design for maintaining tubular member in an azimuth position initially fixed manually. Gear 29 provides a manual input for making an initial adjustment of the elevation angle of tubular member 19. The magnetic gradient of the earth is usually constant over a wide geographical area. Therefore, once member 19 is orientated, no further adjustment is required in any one particular area. In this manner, weight 16 will slide in the direction along the magnetic gradient indicated by arrow 6 at all times so that the unbalanced bridge caused by the change in resistivity of element 17 will indicate accelerations of the device along the gradient. The output of accelerometer 13 is fed through amplifier 33 and thence through a calibrating gain control 34 and a reversing switch 36.

The polarity of the accelerometer signal relative to the magnetometer signal is established by means of the reversing switch 36 so that it opposes the twice differentiated magnetometer signals arising from the accelerations experienced by the aircraft.

The signal delivered by mixing network 13 will be compensated for acceleration noise provided that the accelerometer is already aligned with the gradient and that the signal is of proper polarity and magnitude. These adjustments once set will need to be changed only infrequently to accommodate changes in the gradient vector at widely different geographical locations.

The output of circuit 13 is connected in succession through the low-pass filter section $R_5$ and $C_3$, amplifier 37, low-pass filter section $R_6$ and $C_4$ and amplifier 38 to the recorder 30 which by conventional means records visually the input thereto. The low-pass filter sections are provided for the purpose of attenuating any high frequency components which may be present and of excessive amplitude relative to the desired frequencies. It will be evident that such high frequencies as are present in the magnetometer signal at amplifier 12 input will be accentuated by the high-pass circuits used for differentiating the magnetometer signal. In general it will be desirable to restore the relative amplitudes of high and low frequencies to that which existed prior to differentiation. However, in specific cases this may be unnecessary.

Of course, instead of the differentiating circuits shown, coupled inductances might be used, while the selection of amplifiers and omission thereof will be at the discretion of one constructing this device. Also, the accelerometer may be reduced into three components in some convenient coordinate system, on a suitably stabilized and oriented platform and their outputs combined in proper phase and proportion to simulate an accelerometer aligned along the geomagnetic gradient vector. This would permit convenient adjustment of the orientation of the resultant accelerometer axis from a remote point. It is important that the accelerometer be mounted sufficiently near the magnetometer to experience the identical accelerations which are to be compensated. For example, if the magnetometer is in a towed capsule, the accelerometer should also be in the towed capsule if precise compensation is to be achieved. However, even with a towed magnetometer, approximate compensation can be achieved for those specific accelerations which are common to the capsule and the aircraft by use of an accelerometer mounted in the aircraft.

In the modification of Fig. 2 it will be noted that the magnetometer output is differentiated twice before combining with the acceleration signal. It should also be noted that the magnetometer signal may, alternatively, be combined with a twice integrated accelerometer signal, or that a once differentiated magnetometer signal may be combined with a once integrated accelerometer signal. Any arrangement may be selected as long as the relationship between acceleration and magnetometer output is maintained.

Figure 3:
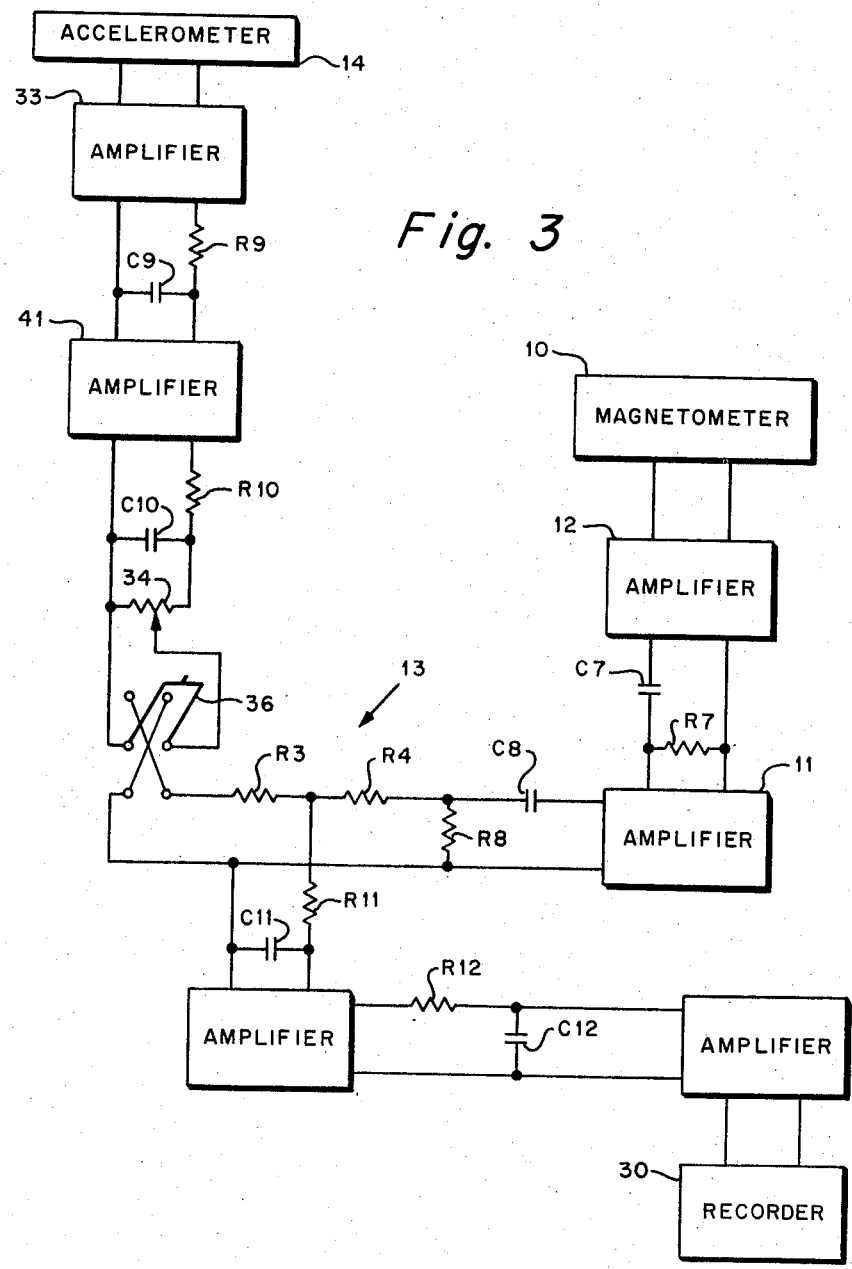
Fig. 3 shows another embodiment of the invention.

Still another arrangement covered by this invention is shown by the alternative construction of Fig. 3. In this arrangement, the output of magnetometer 10 is treated by a pair of high-pass filters $R_7$, $C_7$ and $R_8$, $C_8$, while the output of accelerometer 14 is treated by a pair of low-pass filters $R_9$, $C_9$ and $R_{10}$, $C_{10}$. For ideal compensation of the acceleration noise in magnetometer 10, there is a specific relationship between the time constants $R_7 C_7$ and $R_9C_9$ on the one hand, and between $R_8C_8$ and $R_{10}C_{10}$ on the other hand. The magnetometer output is treated to two successive steps of partial differential by the use of the filters illustrated, and the accelerometer signals are treated to two successive steps of partial integration by its filters shown. The relationship of the filters is such that the first step of each operation causes a total phase shift between signals of exactly 90 degrees, and the same is true of the second steps in these operations. This results in a pair of output signals which are shifted in phase relative to each other of exactly 180-degrees. In other words, the output from filter $R_8C_8$ is exactly twice removed differentially with respect to time from the output of filter $R_{10}C_{10}$.

As a result of the arrangement of Fig. 3, the magnetometer and accelerometer outputs, after the filtering action just described, are of the same order and may be mixed so as to thoroughly cancel the noise component appearing in the former signal. After mixing, the compensated signal may then be applied to appropriate low-pass filters, $R_{11}$, $C_{11}$ and $R_{12}$, $C_{12}$, for example, to restore the desired degree of balance between high and low frequencies, that is, to give the apropriate overall band pass.

It is thus seen that in the magnetic detection of submarines from aircraft, this invention solves one of the problems which has in the past limited the range of detection. It permits the elimination of turn noise in airships where the frequency of the turn maneuver falls within the pass band of the magnetic detector filter and obscures the signal during turns. The invention also reduces the noise due to changes in altitude of the aircraft. Also, in magnetic exploration of geological formations from aircraft, this invention offers the possibility of more precise observations.

Obviously many modifications and variations of the present invention are possible in the light of the above teachings. It is, therefore, to be understood that within the scope of the appended claims the invention may be practiced otherwise than as specifically described.

What is claimed is:

1. A compensator for noise due to accelerations of a magnetometer in a magnetic gradient comprising means to differentiate with respect to time the output of said magnetometer twice in succession, accelerometer means adjacent to said magnetometer for producing an output proportional to the accelerations of said magnetometer along said magnetic gradient, means compensating the output of said magnetometer by combining the output of said accelerometer with the twice differentiated output of said magnetometer so as to effect cancellation of said noise.

2. The compensator of claim 1 having means for correcting said compensated output of said magnetometer for relative unbalance of high and low frequencies introduced by the differentiating process.

3. A compensator for the noise component in a magnetometer output due to accelerations in a magnetic gradient comprising accelerometer means adjacent said magnetometer for producing an output proportional to the accelerations of said magnetometer in the direction of said magnetic gradient, means for adjusting at least one of said outputs so that said magnetometer output is differentially twice removed from said accelerometer output after adjustment, and means for combining said adjusted outputs so as to effect cancellations of said noise.

4. A compensator for noise due to accelerations of a field detector in a field gradient comprising means to differentiate with respect to time the output of said detector twice in succession, accelerometer means adjacent said detector for producing an output proportional to the accelerations of said detector along said gradient, means to combine the output of said accelerometer means with the differentiated output of said detector so as to effect cancellation of said noise, and means to integrate the combined output twice in succession producing a final signal representing the detector output compensated for the noise due to accelerations of said detector.

5. A method for modifying the output of a magnetometer for cancelling the component present due to accelerations of said magnetometer along the magnetic gradient comprising the steps of measuring the accelerations of said magnetometer directly, converting said accelerations into a continuous output of the same form as said magnetometer output, subjecting at least one of said outputs to at least one filtering action causing said magnetometer output to be twice removed differentially from said acceleration output, and combining said outputs after adjustment in a manner in which said acceleration output cancels a portion of said magnetometer output thereby eliminating from said magnetometer output the component due to said accelerations.

6. A method for producing a magnetometer output signal unaffected by accelerations in said magnetometer comprising the steps of differentiating the uncorrected output of said magnetometer twice in succession, measuring the accelerations of said magnetometer directly, converting said accelerations into a continuous output of the same form as said magnetometer output and combining said outputs in such a manner as to cause the accelerations output to cancel the portion of said differentiated magnetometer output caused by accelerations in said magnetometer thereby eliminating deviations in the final output caused by accelerations in said magnetometer.

7. A compensator for the noise component in a field detector output due to accelerations in a field gradient comprising accelerometer means for producing an output indicative of the accelerations of said detector in the direction of said field gradient, means for adjusting at least one of said outputs so that said detector output is differentially twice removed from said accelerometer means output after adjustment and means for combining said outputs after adjustment so as to effect cancellation of said noise.

8. A compensator for noise due to accelerations in the output of a field detector moving in a field gradient comprising accelerometer means for producing an output indicative of the accelerations of said detector in the direction of said field gradient, means for adjusting said outputs so that said detector output is differentially twice removed from said accelerometer means output after adjustment, and means for combining said outputs after adjustment so as to effect cancellation of said noise.

9. A method for modifying the output of a field detector moving in a field to cancel the component present due to accelerations of said detector along the field gradient comprising the steps of measuring the accelerations of said detector directly, converting said accelerations into a continuous output of the same form as said detector output, subjecting at least one of said outputs to filtering action causing said detector output to be twice removed differentially from said acceleration output after said filtering action, and combining said outputs after filtering in a manner in which said acceleration output cancels a portion of said detector output thereby eliminating from said detector output the component due to said accelerations.

No references cited.